United States Patent
Blount et al.

(10) Patent No.: US 10,415,469 B2
(45) Date of Patent: Sep. 17, 2019

(54) HYBRID COMPRESSED AIR/WATER ENERGY STORAGE SYSTEM AND METHOD

(71) Applicant: Savannah River Nuclear Solutions, LLC, Aiken, SC (US)

(72) Inventors: Gerald C. Blount, Aiken, SC (US); Maximillian B. Gorensek, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 196 days.

(21) Appl. No.: 15/686,959

(22) Filed: Aug. 25, 2017

(65) Prior Publication Data

US 2019/0063316 A1 Feb. 28, 2019

(51) Int. Cl.
 *F02C 6/16* (2006.01)
 *F03B 13/06* (2006.01)
 *F02C 6/06* (2006.01)
 *C25B 1/04* (2006.01)

(52) U.S. Cl.
 CPC ............... *F02C 6/16* (2013.01); *C25B 1/04* (2013.01); *F02C 6/06* (2013.01); *F03B 13/06* (2013.01); *F05B 2220/32* (2013.01); *F05B 2220/708* (2013.01); *F05D 2220/32* (2013.01)

(58) Field of Classification Search
 CPC .... F02C 6/16; F02C 6/06; F03B 13/06; C25B 1/04

See application file for complete search history.

(56) References Cited

U.S. PATENT DOCUMENTS

| | | | | |
|---|---|---|---|---|
| 3,812,922 A | * | 5/1974 | Stechler | B63C 7/08 114/313 |
| 4,110,980 A | | 9/1978 | Foulke | |
| 4,508,971 A | | 4/1985 | Bailey | |
| 5,426,332 A | * | 6/1995 | Ullman | F03B 13/26 290/4 D |
| 6,800,954 B1 | * | 10/2004 | Meano | F03B 13/1895 290/42 |
| 7,281,371 B1 | * | 10/2007 | Heidenreich | F03B 13/00 60/398 |

(Continued)

FOREIGN PATENT DOCUMENTS

| FR | 3025593 | 9/2014 |
|---|---|---|
| WO | WO 2006/066691 | 6/2006 |

(Continued)

*Primary Examiner* — Mark A Laurenzi
*Assistant Examiner* — Shafiq Mian
(74) *Attorney, Agent, or Firm* — Dority & Manning, P.A.

(57) ABSTRACT

A hybrid compressed air/water energy storage system is described. The system includes a series of water containers and a plurality of inflatable bladders held within each container. An air compression facility is used to inflate the bladders upon which water is forced out of the containers to a water storage facility at a higher potential energy. The system includes a water powered turbine and an expansion turbine. Thus, the system can produce power from both the water powered turbine (e.g., as a component of a hydroelectric plant) and from the expansion turbine (e.g., as a component of a CAES plant). The system can be utilized in a subsurface land-based system or a submerged water-based system.

20 Claims, 5 Drawing Sheets

(56) References Cited

U.S. PATENT DOCUMENTS

| | | | |
|---|---|---|---|
| 7,696,632 B1* | 4/2010 | Fuller | F04F 10/02 290/43 |
| 7,743,609 B1* | 6/2010 | Brostmeyer | F02C 6/16 60/398 |
| 7,830,032 B1* | 11/2010 | Breen | F03B 13/142 290/53 |
| 8,011,182 B2* | 9/2011 | Hastings | F03B 17/025 290/1 R |
| 8,030,790 B2 | 10/2011 | Kamenov | |
| 8,093,736 B2* | 1/2012 | Raftery | F03B 13/1885 290/42 |
| 8,250,861 B2 | 8/2012 | Schwark et al. | |
| 8,484,364 B2* | 7/2013 | Xia | H04L 67/34 709/229 |
| 8,536,723 B2 | 9/2013 | Roos | |
| 8,610,295 B1* | 12/2013 | Stevens | F03B 17/025 290/1 R |
| 8,643,206 B2 | 2/2014 | Ekern | |
| 8,766,469 B2 | 7/2014 | Payre et al. | |
| 8,766,489 B2 | 7/2014 | Lathrop | |
| 8,920,135 B2* | 12/2014 | Daily | F04B 35/01 417/320 |
| 8,950,181 B2 | 2/2015 | Ivy et al. | |
| 9,139,974 B2* | 9/2015 | Frazier | E02D 29/10 |
| 9,217,233 B2 | 12/2015 | Behm et al. | |
| 9,234,494 B2* | 1/2016 | Anteau | F03B 17/005 |
| 2006/0202483 A1* | 9/2006 | Gonzalez | F03B 13/1845 290/53 |
| 2006/0278154 A1* | 12/2006 | Towley, III | B63B 35/44 114/264 |
| 2008/0019847 A1* | 1/2008 | Burns | F03B 13/148 417/330 |
| 2010/0243087 A1 | 9/2010 | Morrissey | |
| 2010/0308590 A1* | 12/2010 | Rohrer | F03B 13/1815 290/53 |
| 2011/0113771 A1* | 5/2011 | Foster | F03B 13/189 60/501 |
| 2011/0173976 A1 | 7/2011 | Meadon et al. | |
| 2012/0098267 A1 | 4/2012 | Hockenberger et al. | |
| 2012/0167563 A1* | 7/2012 | Cherepashenets | F03B 13/1855 60/504 |
| 2012/0305411 A1* | 12/2012 | Elazari-Volcani | F02C 6/16 206/0.6 |
| 2013/0019591 A1* | 1/2013 | Williams | H02J 15/006 60/398 |
| 2013/0019971 A1* | 1/2013 | Anteau | F03B 17/025 137/571 |
| 2013/0160444 A1* | 6/2013 | Foster | F03B 13/20 60/497 |
| 2014/0191511 A1 | 7/2014 | Markie et al. | |
| 2015/0033722 A1 | 2/2015 | Layton et al. | |
| 2016/0265505 A1 | 9/2016 | Jahangir | |

FOREIGN PATENT DOCUMENTS

| | | |
|---|---|---|
| WO | WO 2015/018914 | 2/2015 |
| WO | WO 2016/128962 | 8/2016 |

* cited by examiner

HYBRID COMPRESSED AIR/WATER ENERGY STORAGE SYSTEM AND METHOD

STATEMENT REGARDING FEDERALLY SPONSORED RESEARCH OR DEVELOPMENT

This invention was made with government support under Contract No. DE-AC09-08SR22470 awarded by the U.S. Department of Energy. The government has certain rights in the invention.

BACKGROUND

Maintaining a balance between energy production and energy demand has always been difficult, especially for large-scale energy production. For instance, traditional electric utilities operate large, efficient power generating plants configured to produce electricity at a rate sufficient to meet a base load. However, when demand rises, even traditional plants may fail to meet the high load. Improvements in energy capture and conversion using alternative energy sources have exacerbated issues with energy production/demand load balancing as alternative energy sources such as wind and solar also tend to be intermittent and unpredictable. The inability to adequately meet hourly, daily, and seasonal fluctuations in demand has slowed large scale penetration of clean, non-traditional energy sources such as wind and solar into the electric grid.

Energy storage systems that can efficiently store excess off-peak energy for use at peak-demand times would go a long way to increasing adoption of alternative energy technologies. Water-based energy storage systems have long been utilized to provide load balancing between energy production and demand. This method stores energy in the form of increased potential energy of water, pumped from a lower elevation to a higher elevation during times of low demand and excess energy production. Low-cost surplus off-peak power is typically used to run the pumps. During periods of high demand, the stored water is released through turbines to retrieve the stored energy and produce power. Unfortunately, losses of the pumping process makes water-based energy storage inefficient.

Compressed Air Energy Storage (CAES) is another example of an energy storage technology that shows promise for storing a large amount of energy at an economical cost. In this system, excess energy produced at low demand is used to compress air that is then stored in a suitable facility (e.g., underground storage). At high demand, the compressed air is expanded to drive a turbine and retrieve the stored energy in production of electricity. While there exist operational CAES systems, they suffer from low overall efficiency.

Accordingly, there is a need for improved energy storage systems. In particular, there is a need to efficiently store energy created by clean, alternative energy sources during times when power demand is low and/or production capability is high so that the energy might be supplied to consistently meet power demands even at times when production capability is low.

SUMMARY

According to one embodiment, disclosed is a hybrid compressed air/water energy storage system. A system can include a container and a series of inflatable bladders held within the container. A system also includes an air compressor in fluid communication with each of the inflatable bladders and a water source in fluid communication with the container via a water flow path. The water flow path is configured such that water from the water source that is delivered to the interior of the container surrounds the inflatable bladders. In addition, a system can include a first turbine within the water flow path and an expansion facility that incorporates a second turbine in communication with the inflatable bladders. During use, the system can produce power from both the first turbine (e.g., as a component of a hydroelectric plant) and from the expansion turbine (e.g., as a component of a CAES plant). The system can be beneficially utilized in some embodiments as a subsurface land-based system or a submerged water-based system.

Also disclosed are methods for storing energy by use of the system. For instance, a method can include storing energy, e.g., energy produced from a clean energy source such as solar or wind, by filling the inflatable bladders held in the container with compressed air. As the compressed air fills the inflatable bladders and the bladders expand, water is pushed out of the container and up an energy gradient to a location that is at a higher potential energy (e.g., a higher elevation reservoir or a body of water surrounding the container).

At a later time of energy production, the stored energy can be accessed by controllably releasing compressed air from one or more of the bladders. Expansion of the compressed air can retrieve stored energy, e.g., by turning the expansion turbine and producing electricity. In addition, and in conjunction with the release of compressed air from the inflatable bladders, water can fall back to fill the container and stored potential energy can likewise be retrieved from the falling water, for instance through turning of a hydroelectric turbine in production of electricity.

Additional efficiencies can be gained in some embodiments. For instance, the falling water turbine can be a reversible turbine and as the water is passed back to the energy storage facility, this reversible turbine can provide power to, e.g., run the air compressor and/or aid in pumping the water up the energy gradient. In one embodiment, energy in the form of heat removed from the air during compression can be stored or utilized. In one embodiment, during expansion the air can be heated by use of a clean energy technology, for instance by use of hydrogen fuel that is produced according to a clean energy electrolysis process.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
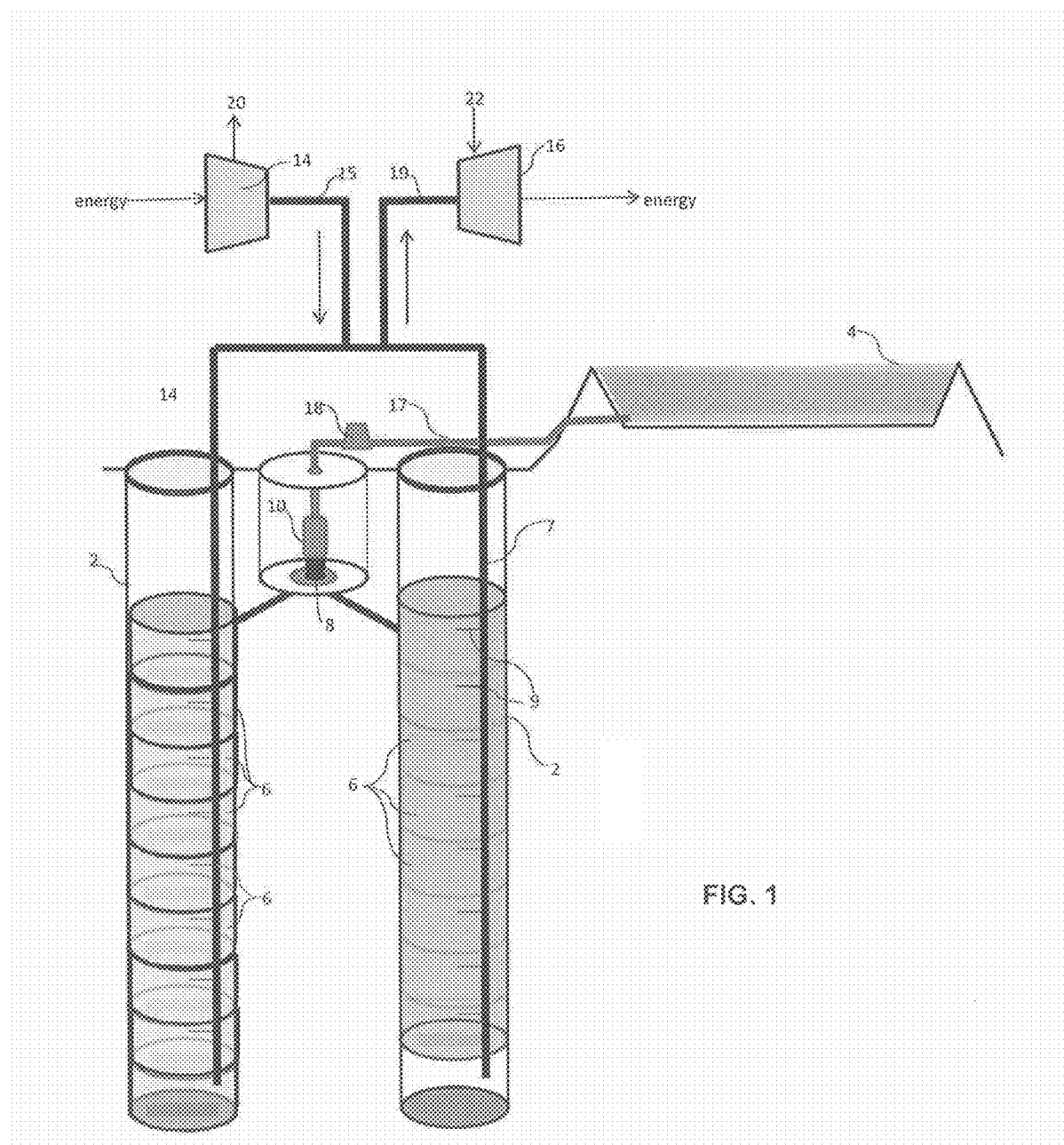
FIG. 1 illustrates a land-based configuration of a hybrid energy storage system.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to an energy storage system that combines the benefits of water-based energy storage and CAES in a single efficient hybrid energy storage system. The system includes a container within which are a plurality of inflatable bladders. The container captures falling water according to a water-based energy storage procedure and the inflatable bladders are used to store compressed air according to a CAES procedure. A system can recover stored energy from the falling water as it passes from a water storage facility to the container and also from the compressed air as it is re-expanded upon controlled release from the inflatable bladders.

Efficiency is gained by the hybrid system as compared to individual CAES and water-based systems by use of the volumetric displacement of the bladders as they are filled with the compressed air of the CAES portion of the system. This volumetric displacement is used to push water out of the container and recharge the energy storage facility of the water-based portion of the system. As such, costs for pumping the water up an energy gradient to the energy storage facility can be decreased or avoided all together. Additional efficiencies can be gained in various embodiments of the system. For instance, inclusion of a reversible turbine in the water-based system can be utilized to provide energy that can be applied to compression of the air in the CAES portion of the system and/or to aid in moving the water to the higher energy storage facility in the water-based portion of the system.

Disclosed systems can be utilized in any application in which energy storage can be beneficial. In one embodiment, the system can be utilized in a power production facility for use in peak-power demand applications. Any power production facility is encompassed including traditional electricity production facilities such as coal-fired, natural gas-fired, hydroelectric, and nuclear powered facilities. In one particular embodiment, the hybrid energy storage systems can be utilized for storage of alternative clean-energy, such as may be produced by, e.g., solar and/or wind energy conversion and capture.

The systems can be utilized in either a land-based or a water-based application. One embodiment of a land-based system is illustrated in FIG. 1. As shown, a system can include one or more containers 2. In one embodiment, the containers 2 can be partially or completely subsurface, which can limit the overall footprint of the system and utilization with a surface reservoir as the energy storage facility in the water-based portion of the system. Each container 2 can be, for example from about 50 meters to several hundred meters in depth, for instance from about 100 m to about 500 m in depth in some embodiments, and can have a diameter on the order of about 100 m or less, for instance from about 5 m to about 20 m in some embodiments.

The containers 2 are in fluid communication with a water storage facility 4. In a land-based system as illustrated in FIG. 1, the water storage facility 4 can be a natural facility (e.g., a lake, pond, or river) or man-made reservoir. Water in the water storage facility 4 is at a higher potential energy as compared to water in the containers 2. Thus, the water storage facility 4 can serve as an energy storage facility as is common for water-based energy storage systems.

During use, water from the water energy storage facility 4 can pass along a flow path 17 that passes through a penstock in order to turn the turbine 8 and capture energy from the water as it falls from the energy storage facility 4 to fill the container 2. The captured energy can then be utilized as desired, for instance in turning the turbine 8 of a hydroelectric power generation facility 10.

Figure 2:
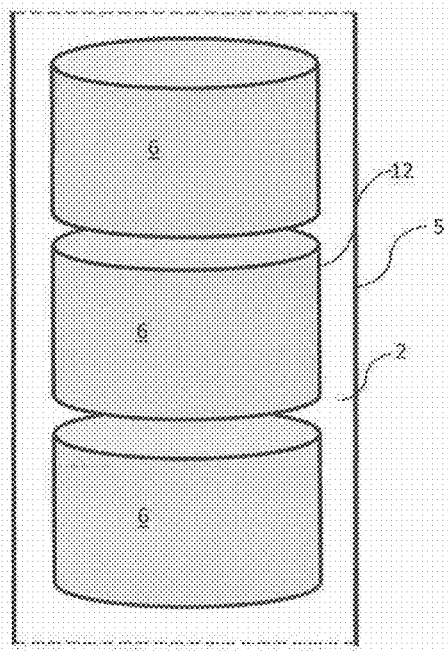
FIG. 2 illustrates a portion of a container including three inflatable bladders.

Within the containers 2 are a series of inflatable bladders 6. The inflatable bladders 6 are configured to retain compressed air from the CAES portion of the hybrid system. FIG. 2 schematically illustrates a portion of a container 2 and three inflatable bladders 6 held within the container. The inflatable bladders 6 can be formed of any material or combination of materials that can retain compressed air over desired storage period. In addition, the inflatable bladders 6 are collapsible and will exhibit a volumetric expansion as they are filled with compressed air. For instance, the inflatable bladders 6 can be formed of a flexible polymeric material, and optionally reinforced with a metal or other high-strength material in order that they expand and contract in size as compressed air enters and exits the bladders and also such that they can withstand the high pressure of the compressed air during energy storage periods.

A single container 2 can hold any number of inflatable bladders 6, with a preferred number generally depending upon the size and power storage capabilities desired of the system. For instance, a small system may include only a single container 2 that holds a small number (e.g., 2 or 3) of inflatable bladders 6, while a large facility as may be a component of a public power utility operation may include 10, 20, or even more containers 2, each of which retaining a large number of inflatable bladders 6 such as 10 or more, for instance from about 20 to about 100, or from about 30 to about 60 inflatable bladders 6 per container 2.

As illustrated in FIG. 2, the inflatable bladders 6 can be retained within a container 2 such that there is a space between the bladder sidewall 12 and the container wall 5. As such, even when the bladders 6 are completely filled with the compressed air, there will be an amount of water within the container 2 and in contact with the container wall 5 such that the pressure on the container walls 5 can be hydrostatic without extreme pressure variation on the container wall as the system cycles between energy storage and energy consumption.

Each inflatable bladder 6 can generally be of a size to retain a useful amount of energy in the compressed air held in the bladders 6 during energy storage. By way of example, an individual inflatable bladder 6 can have a maximum (upon full inflation) volume of about 100 $m^3$ or greater, for instance from about 200 $m^3$ to about 1000 $m^3$ in a land-based system, and even greater in a water-based system, e.g., from about 1000 $m^3$ to about 5000 $m^3$, or even greater in some embodiments. Of course, it should be understood that land-based and water-based systems are not limited to these sizes, and while it may be less complicated to form a water-based system with larger inflatable bladders, the disclosed systems also encompass land-based systems with larger inflatable bladders and water-based systems with smaller inflatable bladders that those specifically described.

The inflatable bladders 6 are the energy storage component of a CAES portion of the system. The CAES portion of the hybrid system can include typical components as are known for a stand-alone CAES facility including, without limitation, a compression facility 14 that is configured to utilize an energy input to compress air and a flow path 15 that is coupled to the compression facility 14 and is configured to transport compressed air from the compression facility 14 to the inflatable bladders 6 that serve as the compressed air storage facility. In this embodiment, the flow path 15 from the compression facility 14 communicates to each of the inflatable bladders 6 via a common line 7 with branches 9 off of the common line 7 to each inflatable bladder 6. Of course, separate lines may alternatively be utilized. The CAES portion of the system also includes an expansion facility 16 that is configured to receive compressed air from the inflatable bladders 6, e.g., via line 7 and flow path 19 and expand the compressed air to regain energy of the compressed air, for instance by generation of electricity.

During use, the system can operate in cycling energy storage periods and energy production periods. An energy storage period can occur at a time during which load on the system is low and/or energy production by the system is high. For instance, when considering an energy production facility that includes wind and/or solar based energy storage, during windy/sunny periods when excess energy is being produced, the system can operate in an energy storage period. At this time, the excess energy produced can be utilized to power the compression facility 14. The compressed air produced at the compression facility 14 can be transported via the flow path 15 to the inflatable bladders 6. As each of the inflatable bladders is filled with the compressed air, the bladder will inflate causing displacement of the water stored in the container 2. This displacement can then be utilized to move the water up an energy gradient and to the water storage facility 4 where energy can be stored in the water-based portion of the system as potential energy held by the stored water.

In one embodiment, the water storage facility 4 can be replenished only by the energy provided by the displacement pumping of the inflatable bladders 6. In other embodiments, pumping can also be utilized to facilitate the energy storage system. For instance the water flow path 17 can include one or more pumps 18 that can in one embodiment be powered by excess energy production. A pump 18 on the water flow path 17 may be either constant speed or variable speed as is known. In one embodiment, the turbine 8 can be a reversible, pumped turbine generator that can serve as both the generator for regaining energy from the stored water as it passes from the water storage facility 4 to the containers 2 and may also serve as a pump when in reverse mode and can be utilized in charging water to the water storage facility 4 in conjunction with the displacement pumping provided by the expansion of the inflatable bladders 4.

As is known, as the air of the CAES portion of the system is compressed and expanded, energy in the form of heat will be lost upon compression. In some embodiments, this lost energy can be simply lost in the form of waste heat. In other embodiments, the system can further include a heat recovery component 20 that can store or utilize at least a portion of the heat lost by the air upon compression. By way of example, in one embodiment the compression facility 14 can be coupled to a heating system at the heat recovery component 20. The heating system can be configured to provide heat to one or more facilities at or near the hybrid system, for instance as hot water or for interior warming purposes. In one embodiment a heat recovery component 20 can include a boiler system configured to generate hot water and the heat recovered by the heat recovery unit 20 can be used to generate hot water.

The expansion facility 16 of the CAES portion of the hybrid system can be coupled to the inflatable bladders 6 held within the containers 2 by a flow path 19. The expansion facility 16 can include one or more expansion turbines that can be used to advantageously utilize the energy recovered from the compressed air. For instance, the expansion facility 16 can include one or more generators coupled to the one or more expansion turbines that are configured to generate electricity.

The compressed air can generally be heated before expansion, e.g., to prevent freezing of moisture in the air. When expansion of the air occurs in one stage, then the heating process can be prior to the expansion. If multiple expansion stages are employed, then heating can be prior to the first expansion stage, between each expansion stage, or between select expansion stages, with each expansion stage and heating thereof based on the expansion pressure ratio as is known. As such, the expansion facility 16 can include a heat source 22. The heat source 22 can be any suitable source and in one embodiment can be designed so as to further improve efficiency of the hybrid system. By way of example, the heat source 22 can include one or more of a combustor, heat recovered from another portion of the system that generates waste heat (e.g., the gas compression facility 14 or the water-based power generation system 10), or other clean energy sources, e.g., solar heat.

In one embodiment, natural gas can be used as a combustor fuel to provide the heat source 22. In other embodiments, the combustor fuel can be obtained from a clean and/or renewable energy source. For instance, in one embodiment hydrogen obtained from electrolysis or biomass conversion can be used as a combustor fuel to provide the heat source. In one particular embodiment, electrolysis of water using power produced by the system can be utilized to provide the heat source 22 according to the overall electrolysis reaction:

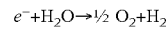

$$e^-+H_2O \rightarrow \tfrac{1}{2}\,O_2+H_2$$

Any suitable electrolyzer is encompassed including alkaline (use a potassium hydroxide electrolyte) and PEM (use a solid polymer membrane electrolyte).

Hydrogen from biomass conversion can be obtained via one or both of thermo-chemical and biochemical processes. Thermo-chemical processes can be preferred in some embodiments as they tend to be less expensive because they can be operated at higher temperatures and therefore obtain higher reaction rates. A thermo-chemical process can include gasification or pyrolysis to produce syngas and can utilize a broad range of biomass types.

The total amount of energy that can be stored by the hybrid system can depend on the volume and falling head of the containers 2, the total number of containers 2, the hydrostatic pressure on the inflatable bladders 6, and the heat applied to the air by the heat source 22 at the expansion facility 16. In addition, by using a vertical arrangement of the inflatable bladders 6 within the containers 2, different bladders 6 can be held at a different hydrostatic pressure within the containers 2 and can store different amounts of energy. This aspect of the systems can provide a control factor for use when releasing energy from the system, with different bladders 6 being accessed depending upon the current energy production needs and only as much energy as required being accessed and released from the system at any time.

Release of energy from the combined energy storage is provided from the combination of controllably emptying one or more of the inflatable bladders 6 to provide compressed air to the expansion facility 16 at the same time as water from the storage facility 4 falls and turns the turbine(s) 8 of the water-based energy generation facility 10. The falling water also fills the volume previously held by the inflated bladders in the container 2 and thus retains the hydrostatic pressure within the container. The ability to control not only the amount of compressed air release but the particular bladders from which the compressed air is released allows for the hybrid system to be designed with a very broad range of control and applicability, from a small, local, energy storage system, for instance to provide power to a single or small number of facilities, to a large energy storage system as may be utilized to provide peak power to a large energy grid.

Figure 3:
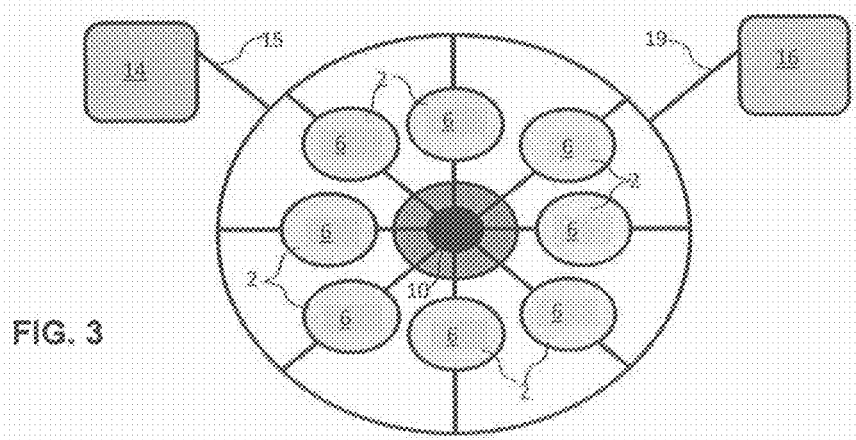
FIG. 3 illustrates a top view of a hybrid energy system in a land-based configuration.

The various components of a hybrid system can be located at a same general location or at distant locations. For instance, FIG. 3 presents a top view of a hybrid system at a single location including a compression facility 14 in communication via flow path 15 with the inflatable bladders 6 held within the containers 2. The inflatable bladders 2 are also in communication via flow path 19 with the expansion facility 16. The inflatable bladders 6 are retained within the containers 2 that are in fluid communication with the water-based power generation system 10. The expansion facility 16 and the compression facility 14 can be located at a same general location as the containers 2 as shown in FIG. 3 or at a different location, and these components of the hybrid system can be located at a different location than water storage facility (not shown in FIG. 3) or nearby, as desired.

Figure 4:
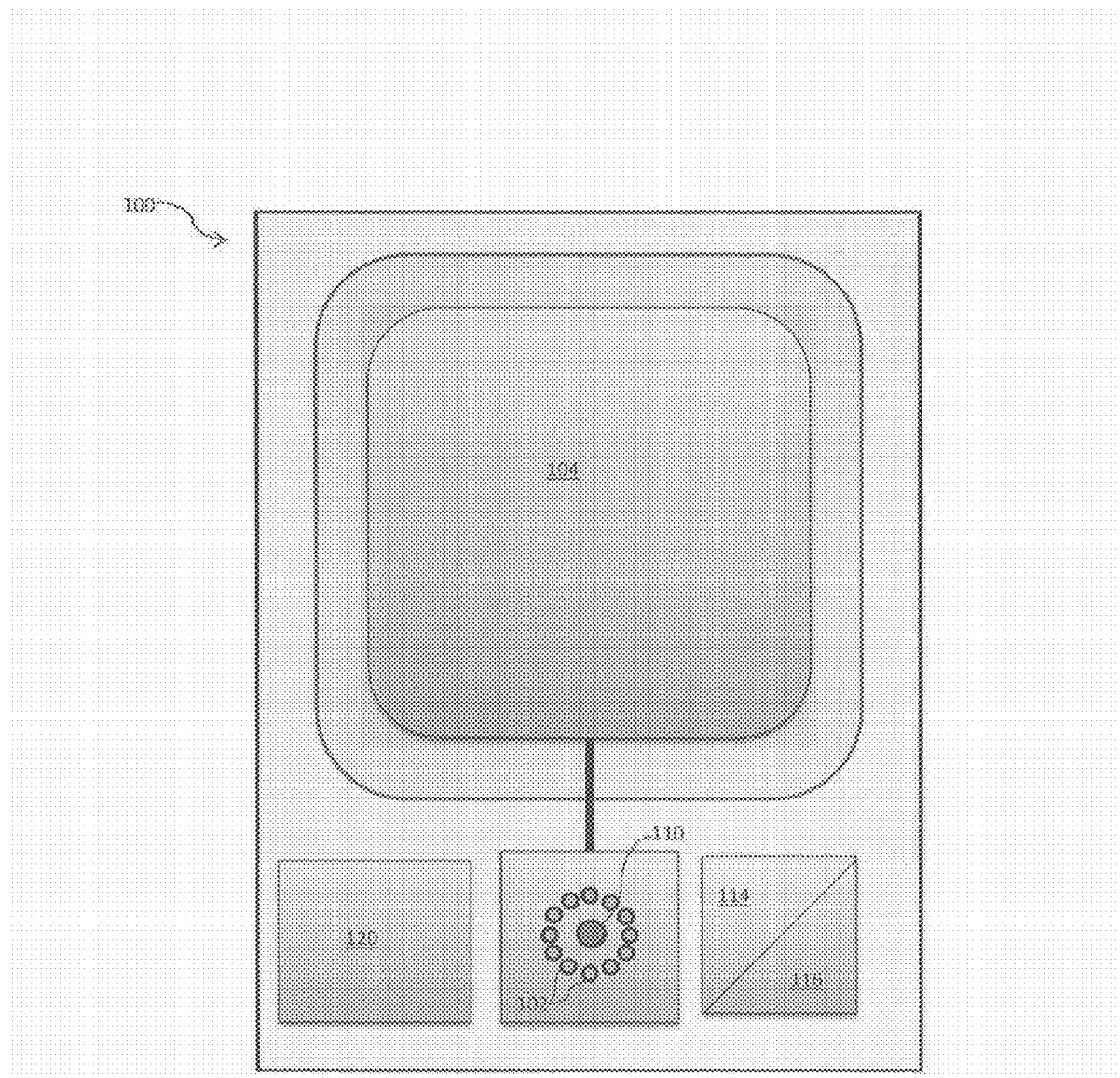
FIG. 4 illustrates a land-based configuration of a hybrid energy storage system.

As discussed above, a land-based system can be formed with the containers vertically aligned in a subsurface orientation. As such, a hybrid system can have a relatively small footprint. By way of example, FIG. 4 illustrates one embodiment of a hybrid system 100 that includes a man-made water storage facility 104 that can be lined and/or covered as is known in communication with a water-based power generation system 110, the containers 102 that retain the inflatable bladders (not shown in FIG. 4), the CAES compression and expansion facilities 114, 116, and a power distribution yard 120. Even when considering a relatively large water storage facility 104, for instance on the order of about 100,000 m³ to about 200,000 m³ capacity, the entire hybrid energy storage system 110 can have a foot print of about 25 acres.

The configuration of the water filled containers of the water-based portion of the hybrid system that retain the inflatable bladders of the CAES-based portion of the hybrid system allows for deployment of a system in either a land-based or in a water-based system. Beneficially, in a land-based embodiment, the same water can be used over and over again between the water storage facility and the containers (e.g., subsurface containers).

Figures 5, 6:
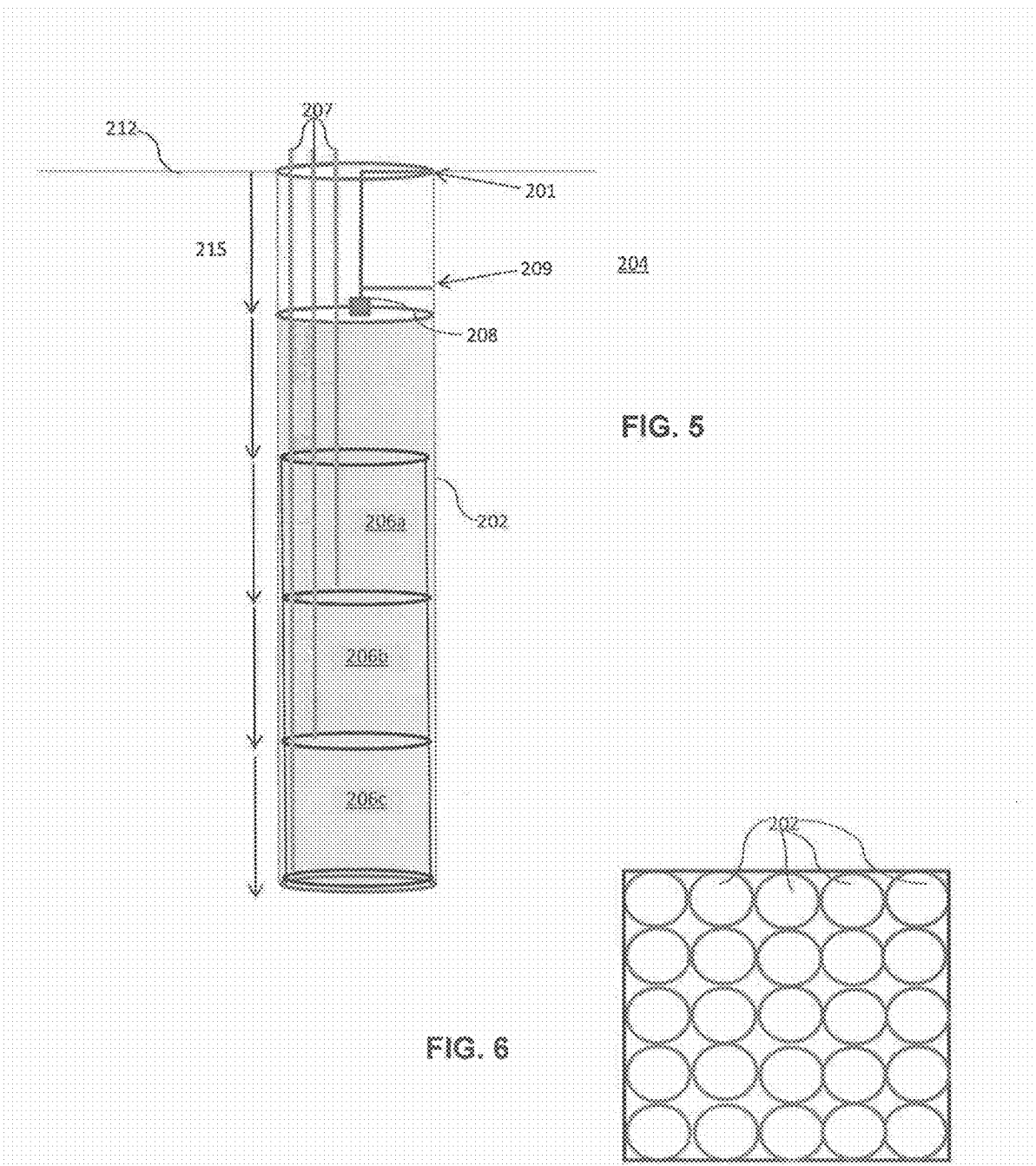
FIG. 5 illustrates a single container in a water-based configuration of a hybrid energy storage system.
FIG. 6 illustrates a top view of a plurality of containers in a water-based configuration of a hybrid energy storage system.

FIG. 5 illustrates a container 202 and three inflatable bladders 206*a*, 206*b*, 206*c* held within the container 202 as may be utilized in a water-based system. In this embodiment, the container 202 can be submerged and the water storage facility 204 can be the water body within which the container 202 is submerged. For instance, the water storage facility 204 can be a lake, reservoir, sea, ocean, etc.

The system can include an inlet 201 through which water from the water storage facility 204 can pass and fall to fill the container 202 as compressed air is released from the inflatable bladders 206*a*, 206*b*, 206*c*. As the water falls along the falling head 215, it can pass through the penstock or turbine 208 and capture energy from the falling water that can be used in electricity production or any other useful application. During energy storage, compressed air can be used to fill the bladders 206*a*, 206*b*, 206*c*, as water is forced from the container and back into the water storage facility 204 via an outlet 209.

Each of the inflatable bladders 206*a*, 206*b*, 206*c* can be in communication with the CAES compression facility and expansion facility, for instance via separate lines 207 (or a combined communications line as illustrated in the land-based system of FIG. 1).

As with the land-based system, the container 202 and inflatable bladders held in the containers 202 can be in a vertical arrangement such that the lowest inflatable bladder 206*c* can be an increased pressure as compared to an inflatable bladder 206*a*, 206*b* closer to the surface of the water storage facility 204 (as indicated by the arrows on FIG. 5). For instance, considering a three bladder system as illustrated in FIG. 5 with each bladder having a vertical height of about 15 m and the upper surface of the upper most bladder 206*a* being about 15 m below the water surface 212 in the container 202, the pressure at the top of the upper most bladder 206*a* can be about 1.5 bar, the pressure at the interface between bladder 206*a* and 206*b* can be about 3 bar, the pressure at the interface between bladder 206*b* and 206*c* can be about 4.5 bar, and the pressure at the bottom of bladder 206*c* can be about 6 bar. Thus, the amount of energy that can be stored in and regained from each of the inflatable bladders can vary, which can add another control and design factor to the hybrid system.

The container 202 can be designed such that water is retained between the wall of the container and the wall of the inflatable bladders, as previously illustrated in FIG. 3. As such, the container wall pressure need only support the hydrostatic head difference between the surface of the water 212 and the drop. In other words, in this embodiment, there can always be water in contact with the interior wall of the container, even when the inflatable bladders 206*a*, 206*b*, 206*c* are completely inflated and as such there will not be a pressure difference horizontally across the wall of the container 202.

A water-based system can generally include a plurality of containers 202. For instance, FIG. 6 illustrates a top view of one embodiment of a water-based system that includes 25 containers 202, each of which retaining a plurality of inflatable bladders. However, as with the land-based system, by use of the vertical containers and a plurality of inflatable bladders in each container, a system can have a relatively small foot print.

Figure 7:
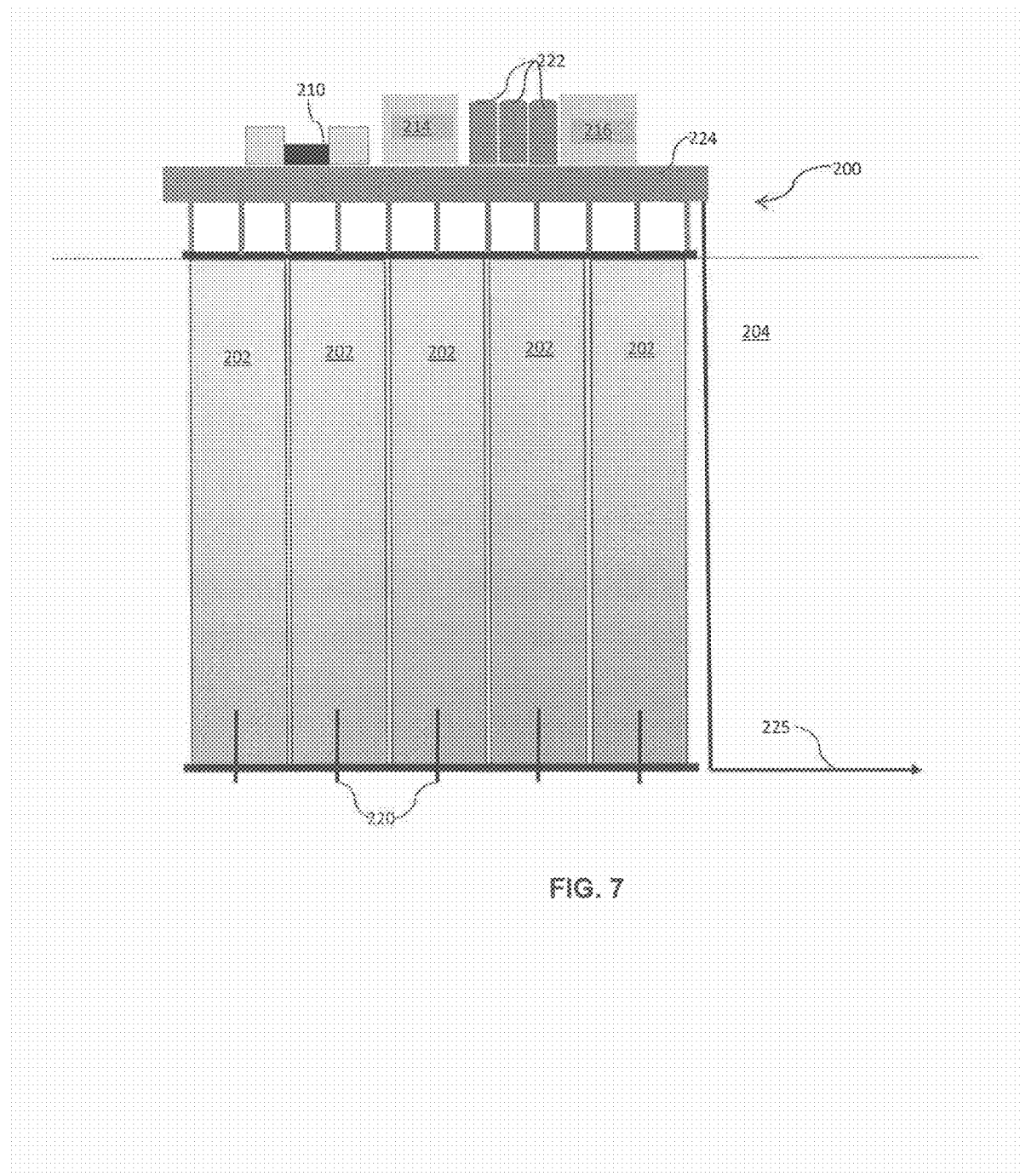
FIG. 7 illustrates a water-based configuration of a hybrid energy storage system.

FIG. 7 illustrates one embodiment of a floating water-based system 200 in which the entire system is held in conjunction with a floating platform 224. As shown, the system 200 can include a plurality of floating containers 202, each of which holding a plurality of inflatable bladders (not shown in FIG. 7). The containers 202 can be anchored within the water body 204, for instance by use of sea floor anchors 220 as are known in the art. The platform 224 can carry some or all of the compression facility 214, the expansion facility 216, a heat source 222 for the expansion facility 216 and the water-based power generation facility 210. Such a system can provide electricity for local use, for instance on or near the platform itself or can send power to a distant location, for instance via undersea carrier line 225.

Such a floating water-based system may be particularly beneficial for use in conjunction with storing wind-generated power.

While certain embodiments of the disclosed subject matter have been described using specific terms, such description is for illustrative purposes only, and it is to be understood that changes and variations may be made without departing from the spirit or scope of the subject matter.

What is claimed is:

1. A hybrid compressed air/water energy storage system comprising:
   a container;
   a series of inflatable bladders within the container;
   an air compression facility in fluid communication with each of the inflatable bladders;
   a water source;
   a water flow path between the water source and the container and configured such that water from the water source delivered to the interior of the container surrounds at least a portion of each of the inflatable bladders;
   a first turbine in the water flow path; and
   an expansion facility incorporating a second turbine in communication with each of the inflatable bladders.

2. The system of claim 1, wherein the container is a subsurface land-based container.

3. The system of claim 1, wherein the container is a submerged water-based container.

4. The system of claim 1, wherein the air compressor is powered by wind or solar energy.

5. The system of claim 1, further comprising a heat source for the expansion facility.

6. The system of claim 5, the heat source comprising an electrolyzer or a natural gas fired combustor.

7. The system of claim 1, wherein the series of inflatable bladders are arranged in a vertically stacked arrangement within the container.

8. The system of claim 1, wherein the water source is a man-made reservoir.

9. The system of claim 1, wherein the first turbine is a reversible turbine.

10. The system of claim 1, the air compression facility comprising a heat recovery component.

11. The system of claim 1, comprising a plurality of the containers, each of the plurality of containers holding a series of inflatable bladders.

12. A method for storing energy comprising:
    compressing air; and
    filling one or more inflatable bladders with the compressed air, the inflatable bladders being retained within a container, the container holding water that surrounds at least a portion of each of the inflatable bladders, wherein upon the one or more inflatable bladders being filled with the compressed air, a first amount of the water is thereby forced out of the container and to a storage location, the first amount of water moving up an energy gradient as it is forced to the storage location.

13. The method of claim 12, further comprising utilizing wind or solar energy to compress the air.

14. The method of claim 12, further comprising turning a motor with the first amount of the water that is forced out of the container.

15. The method of claim 14, the motor providing energy for compressing the air.

16. The method of claim 12, further comprising utilizing the stored energy by controllably releasing compressed air from one or more of the inflatable bladders while simultaneously dropping a second amount of water from the storage location to a lower potential energy value.

17. The method of claim 16, further comprising generating power by expansion of the compressed air.

18. The method of 17, further comprising heating the compressed air prior to the expansion.

19. The method of claim 18, further comprising electrolyzing water to form hydrogen and utilizing the hydrogen as a fuel for heating the compressed air.

20. The method of claim 16, further comprising generating power by turning a turbine with the dropping water.

* * * * *